Sept. 18, 1934.  E. F. DUDLEY  1,974,300
MECHANICAL MOVEMENT
Filed June 11, 1928  5 Sheets-Sheet 1
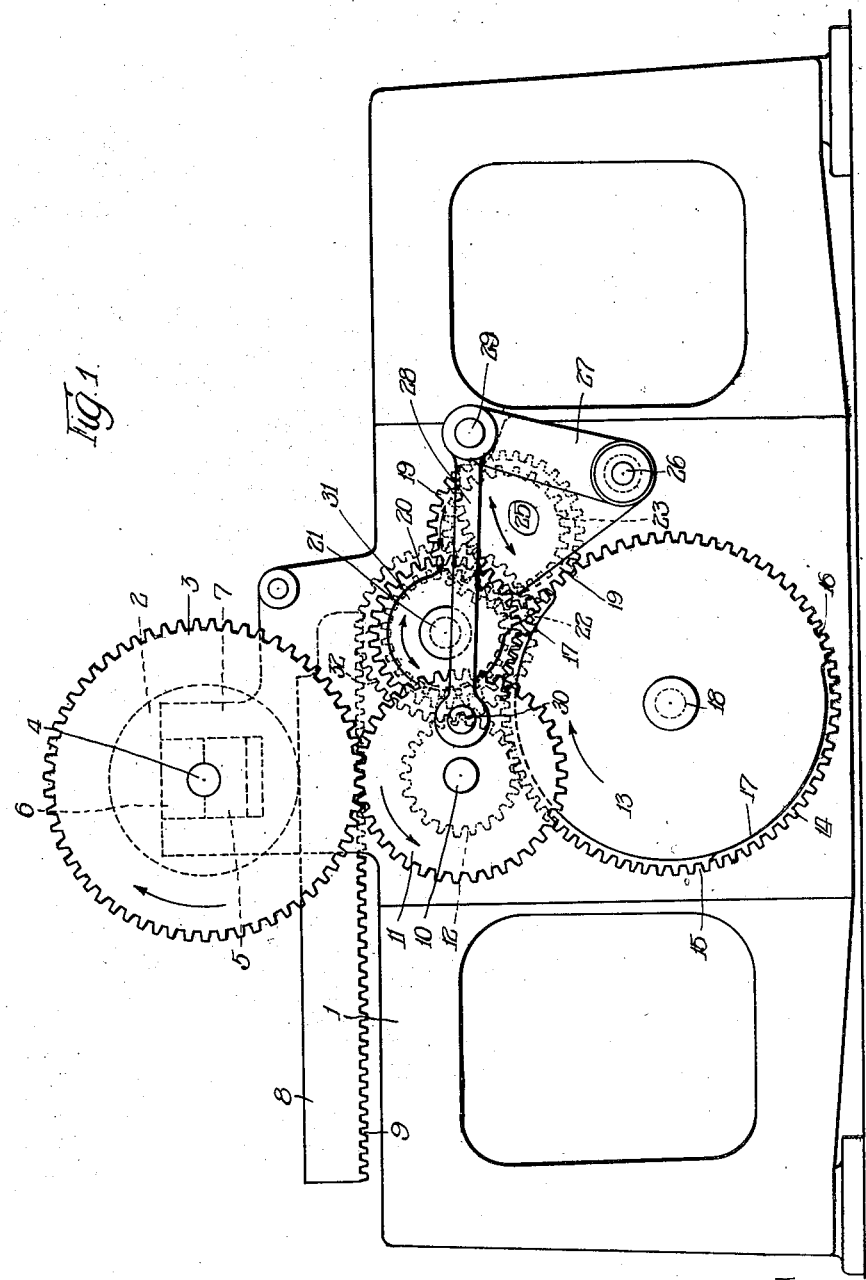

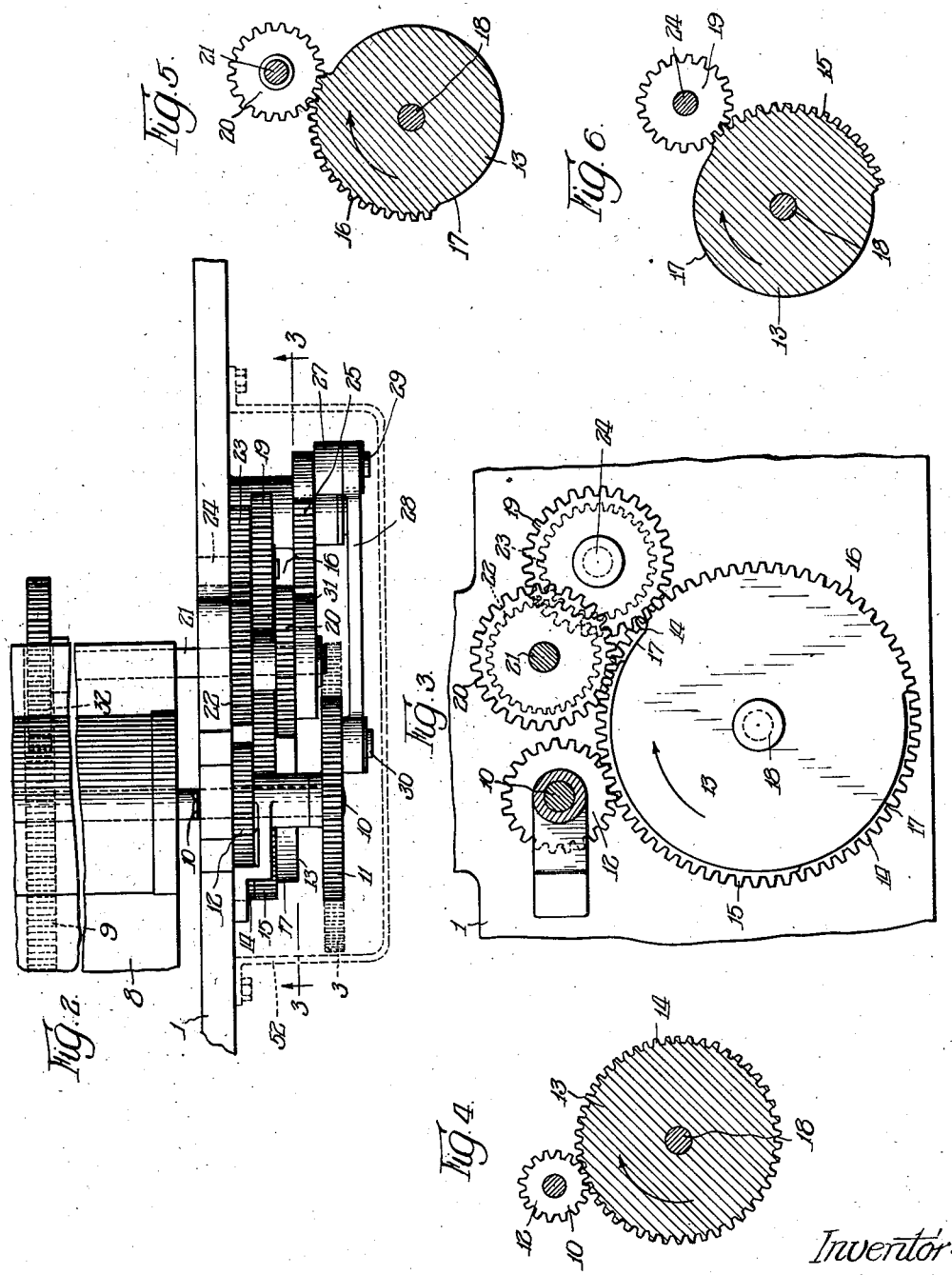

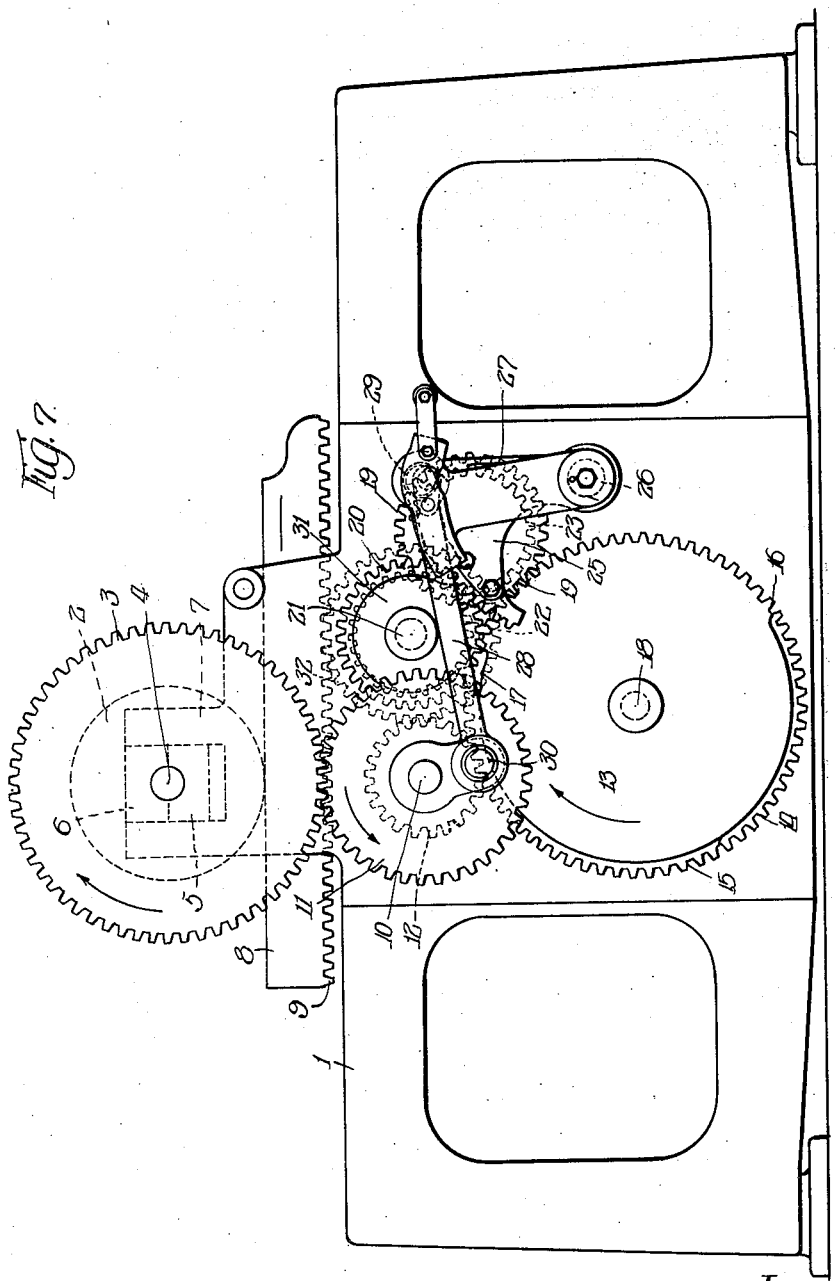

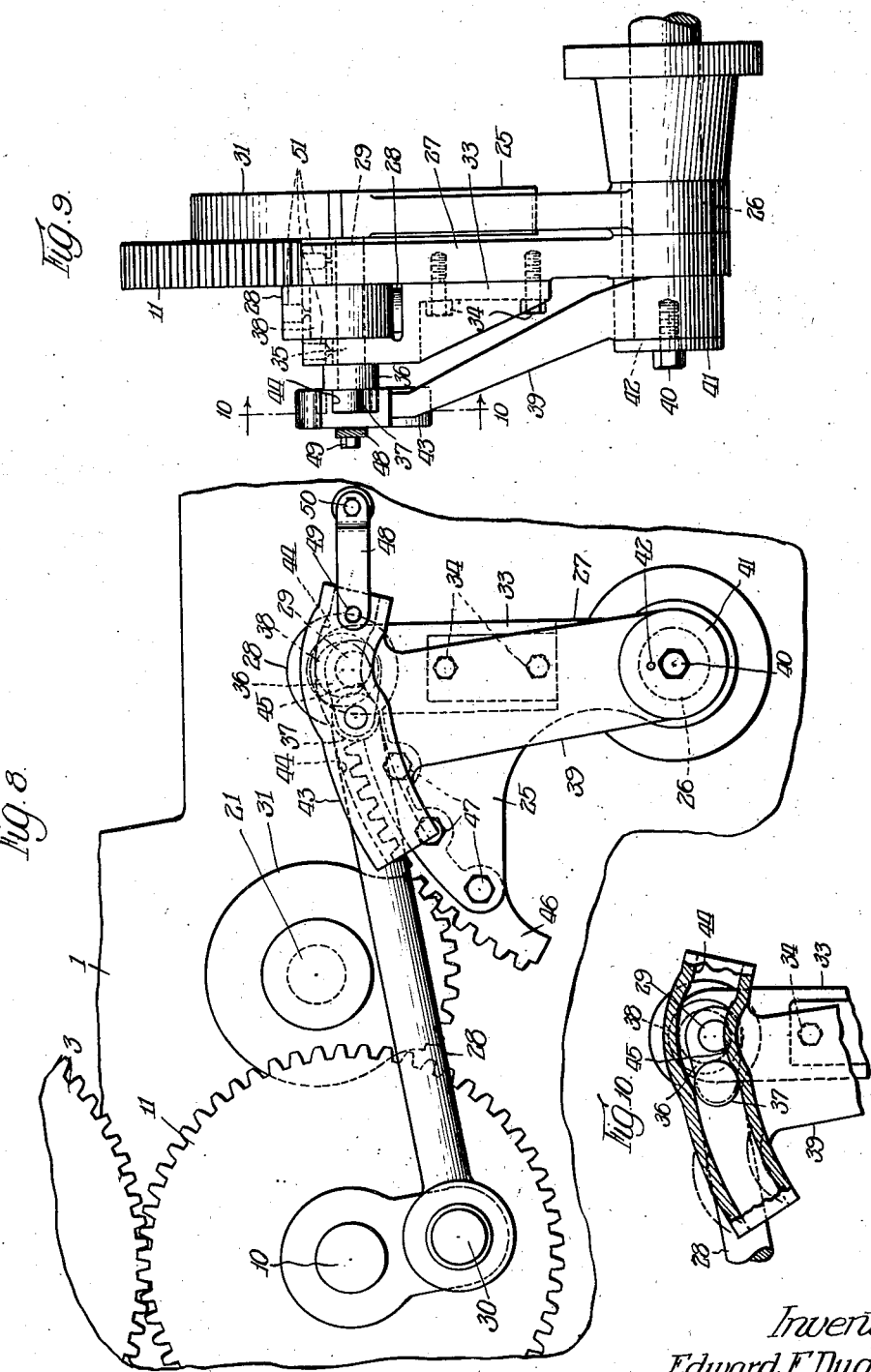

Sept. 18, 1934.  E. F. DUDLEY  1,974,300
MECHANICAL MOVEMENT
Filed June 11, 1928  5 Sheets-Sheet 5
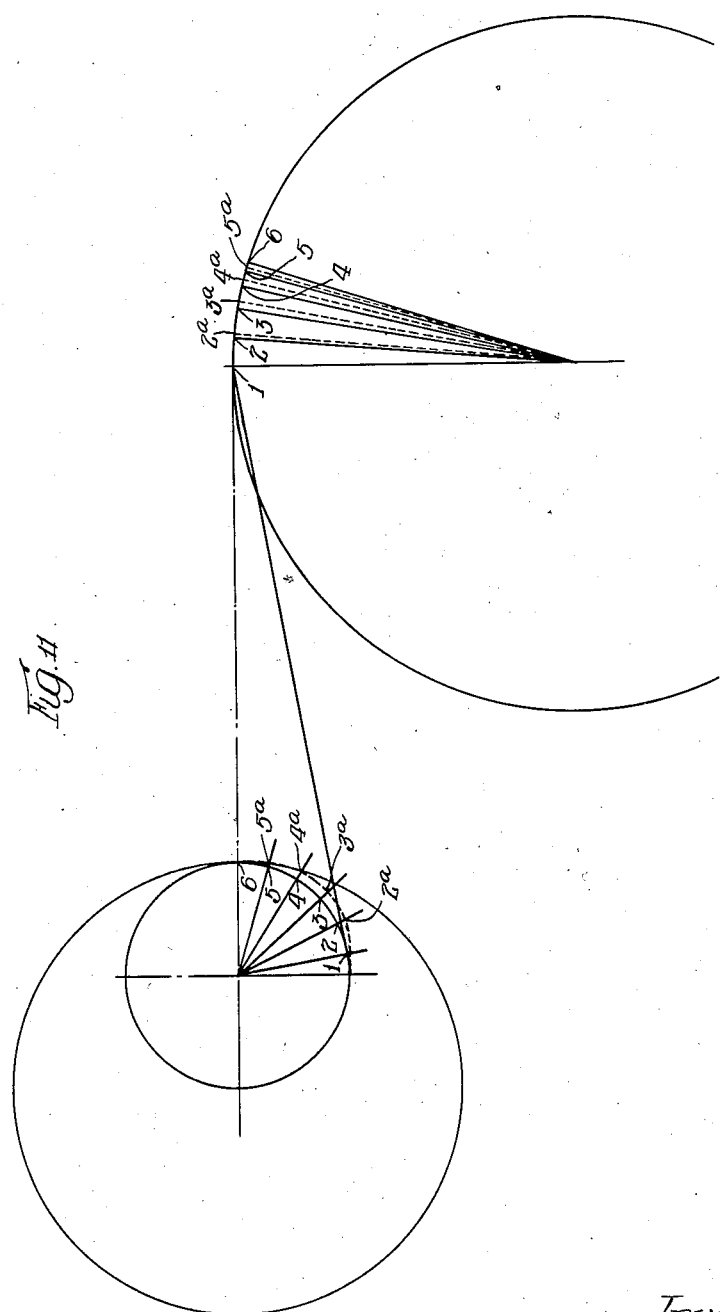

Patented Sept. 18, 1934

1,974,300

UNITED STATES PATENT OFFICE 1,974,300

MECHANICAL MOVEMENT

Edward F. Dudley, Oak Park, Ill., assignor to The Miehle Printing Press & Manufacturing Company, Chicago, Ill., a corporation of Illinois Application June 11, 1928, Serial No. 284,354

6 Claims. (Cl. 74—27)

This invention relates to improvements in means for converting rotary motion into reciprocating motion. It is more particularly adapted for use in connection with such type of machinery where it is required to reciprocate large masses or heavy parts at a considerable velocity, and to retard, stop and oppositely accelerate such masses or parts within a short distance at the end of each reciprocating stroke thereof.

The invention provides an improved mechanical movement which is especially applicable in connection with printing presses of the flat bed type where the type bed is moved rapidly to and fro, and preferably at a uniform speed throughout the greater portion of its reciprocating strokes, while near the end of each stroke it is retarded, stopped and reversed.

In bed motions of printing presses it is primarily essential that the type bed be under positive control during any part of its reciprocating strokes. It is also very desirable to limit the retarding, stopping and reversing action of the bed to a minimum of its stroke in order to maintain the medial, or uniform printing stroke of the bed at a maximum. Furthermore, the reverse movement of the type bed should be accomplished with the least possible shock or jar so that the press may be operated at the greatest possible speed without any danger of shifting it on its foundation, or without subjecting the press to any excessive strain.

The principal object of the invention, therefore, is to provide a simple, reliable and efficient reciprocating mechanism whereby the above requirements will be met in a practical manner, and whereby the reciprocating element, such as a type bed, will be under positive control at all points of its reciprocating cycle.

Another object of the invention resides in the provision of a mechanical movement which is simple and effective in its operation, is economical in its construction and limited to a minimum number of parts, thereby eliminating for example such elements as rack hangers and other cumbersome and heavy parts which heretofore were essential in such type of mechanism.

A further object of my invention is to provide a mechanism whereby the medial stroke as well as the reverse in the movement of the member to be reciprocated will be accomplished by one independent unit of driving elements.

A still further object of the invention is to arrange the cooperating elements in such a manner so as to occupy a minimum amount of space and to provide a compact construction that can be assembled as a unit, preferably in an oil tight casing or the like and adapted to be readily attached to any machine requiring the movements in question.

Other novel features and advantages forming the subject of my invention will be apparent from the following description and appended claims.

In the accompanying drawings in which like reference characters denote similar parts, Figure 1 represents a side elevation of a printing press to which the invention is applied;

Figure 2 is a plan view of the improved mechanical movement with certain parts of the press omitted so as to more clearly indicate the relative arrangement of the cooperating elements;

Figure 3 is a partial, sectional elevation taken on a plane indicated by line 3—3 of Figure 2;

Figures 4, 5 and 6 are cross-sectional detail views of cooperating pairs of gear members forming part of the present invention and shown at a reduced scale;

Figure 7 represents a side elevation of a modified form of the invention;

Figure 8 is an enlarged detail view of the modification illustrated in Figure 7 with some of the gears omitted so as to show only those elements which constitute the modification;

Figure 9 is a cross-sectional view of the parts shown in Figure 8;

Figure 10 is a fractional cross-section taken on a plane indicated by line 10—10 in Figure 9; and Figure 11 is a diagram indicating in broken lines the change in the curve of the reverse cycle according to the modification shown in Figures 7–10.

I have illustrated my invention by way of example as applied to a printing press having a main frame 1. The impression cylinder 2 is provided with a gear 3 whereby the cylinder is rotated as will be apparent from the following description. The cylinder shaft 4 is supported in any suitable manner, such as for instance by bearing blocks 5 and 6 mounted within upright extensions 7 of the frame 1. The type bed 8 is arranged in a usual manner to reciprocate beneath the cylinder 2 and is provided at its lower surface with one or more longitudinally extending racks 9 which are in constant mesh with a corresponding number of driving pinions of the bed motion mechanism.

The latter comprises a shaft 10 driven by the power means of the printing press and carries gears 11 and 12. The gear 11 meshes with the gear 3 of the impression cylinder, while the gear 12 is in mesh with the continuous gear section 14 of a gear 13 mounted on the shaft 18. It will be seen upon inspection of Figures 1, 2, 3, 5 and 6, that the gear 13 is also provided with gear sectors 15 and 16 which have the same pitch as the gear of the sector 14 and are formed by cut-away portions or gaps indicated at 17. The sectors 15 and 16 alternately mesh with gears 19 and 20 respectively, that is to say, when the sector 15 is in mesh with the gear 19, the sector 16 is out of mesh with the gear 20 and vice-versa. The shaft 21 on which the gear 20 is rigidly mounted also has secured thereto an idler pinion 22 which latter is in constant mesh with a second idler pinion 23 rigidly mounted on the stud 24 to which the gear 19 is secured. Inasmuch as the idlers 22 and 23 are in constant mesh, the relative position of the sector 15 to the gear 19 and of the sector 16 to the gear 20 will be maintained, and therefore the meshing relation of said sectors and gears will also remain the same.

The reference numeral 25 denotes a reverse segment which is mounted to pivot about the axis of the stud 26. The latter is secured to the frame 1 of the press in any suitable manner and also carries a crank arm 27 which is mounted so as to oscillate with the reverse segment 25. The oscillatory movement of the segment 25 and arm 27 is imparted by means of a connecting rod 28, one end of which is pivoted to the crank pin 29 provided on the arm 27, while the other end is connected to the crank pin 30 provided on the cylinder driving gear 11, or on a crank arm secured to the driving shaft 10, as may be desired.

The shaft 21 has also rigidly mounted thereon a segmental gear 31 which meshes with the reverse segment 25 and transmits the motion of the latter to the type bed 8 of the press during the reverse cycle thereof and through the intermediary of the gear 32 and rack 9.

For the particular purpose of the machine in connection with which the invention is illustrated by way of example, the ratio of gearing is such that the ratio of rotation between the various cooperating gear members is as follows:

The gear 12 makes three revolutions to each one of the gear 13;

The gears 19 and 20 make two alternate revolutions to each one of the gear 13, i. e, one revolution in one direction and one revolution in the other direction;

The gear 11 makes one and one-half revolutons to one revolution of the cylinder gear 3.

Therefore, the cylinder 2 of the press, which press in this particular case is of the "two-revolution" type, makes two revolutions during one complete cycle of the press, that is to say that during one reciprocating stroke of the bed the cylinder 2 is on impression, while during the other reciprocating stroke of the bed 8, the cylinder is tripped, in other words, it is raised out of engagement with said bed so as to render it inoperative, when the bed passes beneath it.

The operation of the mechanism so far described is as follows:

Assuming that the shaft 10, which is driven by any suitable means, rotates in an anticlockwise direction as indicated by the arrow in Figure 1, then the impression cylinder 2 will be rotated in a clockwise direction owing to the meshing engagement of the gear 11 with the cylinder gear 3.

As already explained, the gear 12, which is rigidly mounted on the shaft 10, is in constant mesh with the continuous gear sector 14 of the gear 13, see Figure 4, thus the latter is also constantly rotated in a clockwise direction. The gear sectors 15 and 16, formed on the gear 13 and shown in Figures 5 and 6, mesh with the intermediate gears 19 and 20 respectively, their relative position being such that while the sector 15 and gear 19 are in mesh, the sector 16 and gear 20 are out of mesh, the gear 20 continuing to rotate idly, but in a reversed direction to the direction of rotation of the gear 19, or vice-versa. This idling of the gears 19 or 20 is accomplished by the provision of the pinions or idlers 22 and 23, which are rigidly mounted on the shafts 21 and 24 respectively and are in constant intermeshing engagement. It will be understood, therefore, that during one revolution of the gear 13, the intermediate gears 19 and 20 each perform two revolutions, namely, one revolution in one direction and one revolution in the opposite direction. This of course is also true of the gear 32 which meshes with the rack 9 and is mounted solid on the shaft 21 and therefore oscillates with the intermediate gear 20, thereby transmitting a reciprocating motion to the type bed 8.

It should here be pointed out that between the alternate periods of engagement of the sector 15 with gear 19, and of the sector 16 with gear 20, there is a predetermined interval during which neither the sector 15 nor the sector 16 are in mesh with their cooperating gears, namely 19 and 20. This period or interval of nonengagement is provided for the purpose of transferring the control of the bed to the reverse mechanism which retards, stops, reverses and accelerates the motion of the type bed during the cycle of operation of the press, that is to say, at the end of each reciprocating stroke of the type bed.

As hereinabove referred to, in mechanism of this kind, namely where a heavy part such as a type bed of a printing press has to be reciprocated, it is very essential that the reciprocating part be under positive control at all times during its complete reciprocating stroke, that is, during its medial stroke as well as during the reverse cycle thereof.

The cooperation of the parts hereinbefore described will assure positive control of the type bed or the like during the medial portion of its stroke, while at the end of each reciprocating stroke the reverse cycle is controlled in an exceedingly simple and efficient manner by the following arrangement.

As described with reference to Figure 1, the shaft 21 has rigidly mounted thereon the segmental gear 31 which alternately meshes with the reverse segment 25, which latter is oscillated about the axis 26 by the crank action transmitted from the drive shaft 10 by means of the connecting rod 28.

Inasmuch as the gear 20 makes two alternate revolutions during each cycle of the press, the teeth of the sector 31 will run into mesh with the teeth of the reverse segment 25 twice during each cycle. The sector 31 and segment 25 are so set relatively to each other that they will run into mesh shortly prior to the end of the medial portion of each reciprocating stroke of the bed, namely before the gear 19 runs out of mesh with the tooth sector 15 of the gear 13 at the end of the medial portion of one stroke of the bed, or before the gear 20 runs out of mesh with the tooth sector 16 of the gear 13 at the end of the medial portion of the other stroke of the bed. Preferably, the relative setting of the cooperating gear members is such that the sector 31 and reverse segment 25 are in full meshing relation when the tooth sector 15 and the gear 19, or the tooth sector 16 and the gear 20, respectively, run out of mesh. This arrangement assures a positive control of the bed 8 during its reverse cycle.

It will be evident that due to the crank action which is transmitted by means of the connecting rods 28 from the driving shaft 10 to the reverse segment 25, and hence to the sector 31, the motion of the bed will be gradually retarded from the time the segment 25 and sector 31 run into mesh and until the crank has reached its dead center at which time the bed stops in one of its end positions, as shown in Figure 1.

Upon continued rotation of the driving shaft 10, and as soon as the crank, such as represented by the pin 30, has passed its dead center, the direction of the stroke of the bed 8 will be reversed and its speed gradually accelerated until the tooth sector 15 of the gear 13 runs into mesh with the gear 19 to drive the bed throughout the medial portion of its stroke. At that moment, the bed has assumed its normal speed, the reverse segment 25 and sector 31 have run out of mesh, and the control of the bed is again returned or transferred from the reverse mechanism to the mechanism whereby the bed is driven at a constant or uniform speed throughout the medial portion of its stroke.

Under certain conditions it might be desirable to provide means whereby the curve of the reverse cycle can be changed so that the retardation or acceleration of the speed during the reverse cycle of a type bed, or of any other element to which a reciprocating motion is to be imparted, can be varied, i. e., modified at will.

Such variation of the curve, which represents the reverse cycle of the type bed or the like, can be very readily attained according to my invention by incorporating a minor constructional modification in the mechanism hereinbefore described and without departing from the spirit of the invention.

The principle of this modification consists in varying the distance between the axis of the crank pin 29 relatively to the axis of the crank pin 30, or relatively to the axis of the stud 26 during the reverse cycle of the reciprocating element, for the purpose of varying the effective length of the crank arm 27 or of the connecting rod 28 so as to correspondingly vary the crank action transmitted thereby.

Figure 11 illustrates one variation of the reverse curve. Points 1–6 indicate the curve obtained with the construction shown in Figures 1–6, while points 2a, 3a, 4a, and 5a indicate one possible change in position of the corresponding points 2–5, i. e. the change in the reverse curve, when the modification illustrated in Figures 7–10 is applied.

There are of course various schemes possible whereby the same result could be accomplished and therefore I do not wish to limit myself to any specific construction such as I have chosen merely to illustrate the modification by way of example.

The preferred form of mechanism whereby I vary the curve, which represents the reverse cycle of a reciprocating element, comprises in principle a cam element which cooperates with an eccentric so as to periodically shift the pivotal axis of the point of connection between the crank arm 27 and the connecting rod 28.

Referring to Figures 8 and 9 of the drawings, a bearing bracket 33 is bolted at 34 to the crank arm 27 so as to form with the latter a yoke for supporting an extension 35 of the crank pin 29. The outer end of said extension has rigidly secured thereto a link 36, the free end of which carries a roller 37. Adjacent to the inner end of the crank pin 29 which is journaled to the crank arm 27, said pin is provided with an eccentric part 38 journaled within the bearing formed in the outer end of the connecting rod 28.

The reference character 39 denotes a cam supporting bracket which is mounted and retained on the stud 26 by means of a bolt 40, retaining washer 41, and set pin 42. The free end of the bracket 39 is provided with a cam portion 43 within the inner face of which is formed a cam way 44 with a cusp 45 and within which way rides the roller 37 as more clearly illustrated in Figure 10. 46 indicates a segmental rack mounted on the reverse segment 25 by means of bolts 47 so that it can be readily replaced. Preferably, the cam supporting bracket 39 is rigidly held in position on the machine frame by means of a strip or bracket 48 secured by means of bolts 49 and 50. The various bearing surfaces of the cooperating parts constituting this modification are lubricated by means of oil cups indicated at 51.

In Figure 2 of the drawings, I have indicated by broken lines one way of inclosing the mechanism as a unit within an oil-tight casing 52.

The modified reverse mechanism just described functions in the following manner, it being understood of course that the particular form illustrated is to change the curve of the reverse cycle during only one reverse cycle of the reciprocating element, and that in order to change said curve during both reverse cycles, it would merely be necessary to provide a second cam cusp, or high part, in the cam way 44 at a point that corresponds with the other reverse cycle, and the approximate position of which second cusp is indicated by broken lines in Figure 10.

The relative position of the cooperating parts illustrated in Figures 8 and 10 corresponds to the position of the press shown in Figure 7, according to which the bed 8 has completed somewhat more than one-half of its reciprocating stroke from right to left as indicated by the arrow. In this position the roller 37, which rides within the cam way 44, has reached a point where it is about to ride over the cam cusp 45. It will be apparent that upon continued rotation of the driving shaft 10, the link 36 which carries the roller 37, will be rocked upwardly as the latter passes over the cusp 45. Consequently, the eccentric 38 will be rotated in a clockwise direction whereby the axis of the crank pin 29 will be displaced to some extent and the distance between said axis and the axis of the stud 26 will be increased, resulting in a more gradual decrease of the motion of the reciprocating element during its reverse cycle. As the roller 37 continues to ride over the cusp 45, the link will be rocked downwardly and as a result of this action, the acceleration of the motion during the reverse cycle of the reciprocating element will also be correspondingly modified.

By increasing the height of the cam cusp, or if preferred, by reversing the cam way so that the cusp 45 will project from the upper wall of the cam way, a large number of variations in the reverse curve can be obtained.

I claim:

1. In combination with a reciprocating type bed of a printing press, means comprising a train of gears operatively associated therewith through the intermediary of a shaft driven by said gears and having a driving member thereon which engages said type bed to drive it uniformly during the medial portion of its reciprocating strokes, and to reverse it at the end of each reciprocating stroke, said train of gears having incorporated therein means whereby the reverse motion of the reciprocating type bed can be varied.

2. In a bed motion mechanism of a printing press, the combination of a reciprocating type bed, an impression cylinder cooperating therewith, means for driving said cylinder, means for driving said type bed uniformly during the medial portion of its reciprocating strokes and while in cooperative relation with said cylinder, and means for reversing said type bed at the end of each reciprocating stroke, said reversing means comprising a self-contained train of gears and means embodied therein whereby the reverse motion of said bed can be varied.

3. In a printing press or the like, the combination of a reciprocating type bed, a gear element on said type bed, a pinion meshing with said element, a driven shaft for said pinion, and a driving unit for said shaft comprising intermeshing gears, means mounting said unit exteriorly of the press frame, the said unit acting on said driven shaft to drive said type bed uniformly during the medial portion of its reciprocating strokes as well as to reverse it at the end of each stroke.

4. In a printing press or the like, the combination of a reciprocating type bed, a gear element on said type bed, a pinion meshing with said element, a driven shaft for said pinion, a driving unit for said shaft comprising intermeshing gears, means mounting said unit exteriorly of the press frame, the said unit acting on said driven shaft to drive said type bed uniformly during the medial portion of its reciprocating strokes as well as to reverse it at the end of each stroke, and means whereby the reverse motion of said member can be varied.

5. In a printing press or the like, the combination of a reciprocating member, a gear element on said member, a pinion meshing with said element, a driven shaft for said pinion, a driving unit for said shaft comprising intermeshing gears arranged in positive, bodily fixed relation to each other, and means mounting said unit exteriorly of the press frame, said unit acting on said driven shaft to drive said member uniformly during the medial portions of its reciprocating strokes, as well as to reverse it at the end of each stroke.

6. In a printing press, the combination of a reciprocating type bed, a single rack element thereon, a pinion meshing with said element, a driven shaft for said pinion, a driving unit for said shaft comprising intermeshing gears, including a reverse segment, all arranged in bodily fixed relation to each other, and means mounting said unit exteriorly of the press frame, said unit acting on said driven shaft to drive said type bed uniformly through the medial portion of its reciprocating strokes, and to slow down, reverse, and accelerate said type bed at the end of each stroke.

EDWARD F. DUDLEY.